(12) United States Patent
Haddad et al.

(10) Patent No.: US 9,950,207 B2
(45) Date of Patent: Apr. 24, 2018

(54) EXERCISE TIRE FRAME

(71) Applicant: CageUp, LLC, Basking Ridge, NJ (US)

(72) Inventors: Philip Haddad, Basking Ridge, NJ (US); Joseph Haddad, Berkeley Heights, NJ (US)

(73) Assignee: CageUp, LLC, Basking Ridge, NJ (US)

( * ) Notice: Subject to any disclaimer, the term of this patent is extended or adjusted under 35 U.S.C. 154(b) by 0 days.

(21) Appl. No.: 15/196,380

(22) Filed: Jun. 29, 2016

(65) Prior Publication Data

US 2017/0014668 A1    Jan. 19, 2017

Related U.S. Application Data

(60) Provisional application No. 62/231,709, filed on Jul. 15, 2015.

(51) Int. Cl.
| | |
|---|---|
| *A63B 17/02* | (2006.01) |
| *A63B 21/00* | (2006.01) |
| *A63B 21/06* | (2006.01) |
| *A63B 21/072* | (2006.01) |
| *A63B 22/20* | (2006.01) |
| *A63B 23/035* | (2006.01) |
| *A63B 23/04* | (2006.01) |
| *B60C 1/00* | (2006.01) |

(52) U.S. Cl.
CPC .......... *A63B 21/4035* (2015.10); *A63B 21/06* (2013.01); *A63B 21/072* (2013.01); *A63B 23/03525* (2013.01); *A63B 23/0405* (2013.01); *A63B 23/047* (2013.01); *B60C 1/00* (2013.01); *A63B 17/02* (2013.01); *A63B 22/20* (2013.01); *A63B 2023/0411* (2013.01)

(58) Field of Classification Search
CPC ....... A63B 23/047; A63B 21/06–21/08; B60C 25/147; B60C 25/15
See application file for complete search history.

(56) References Cited

U.S. PATENT DOCUMENTS 8,986,172 B2 *   3/2015   Poole ................. A63B 21/0552
                                                                  473/441
9,315,080 B1 *   4/2016   Kliskey ................. B60B 29/002

* cited by examiner

*Primary Examiner* — Loan H Thanh
*Assistant Examiner* — Jennifer M Deichl
(74) *Attorney, Agent, or Firm* — Lerner, David, Littenberg, Krumholz & Mentlik, LLP

(57) ABSTRACT

An exercise device includes a frame having a width and a length and defining a first opening extending in a direction perpendicular to the width and the length. The first opening is sized to retain at least a portion of a weighted object therein such that the width and the length of the frame extends along at least a portion of a width and a length of the weighted object, respectively, and externally thereto when the frame is connected to the weighted object. A handle member is connected to the frame to be gripped by a user.

20 Claims, 6 Drawing Sheets

EXERCISE TIRE FRAME

CROSS-REFERENCE TO RELATED APPLICATION

This application claims the benefit of the filing date of U.S. Provisional Patent Application No. 62/231,709 filed Jul. 15, 2015 the disclosure of which is hereby incorporated herein by reference.

BACKGROUND OF THE INVENTION

Physical exercise is well understood to promote physical health and mental well-being. Exercise is facilitated by a variety of exercise equipment to help a user achieve particular results and objectives. One such piece of equipment that has become increasingly popular is the exercise tire. An exercise tire is a heavy, large diameter tire, such as a tractor tire, that is typically used to perform a "tire flip." A tire-flip exercise generally involves a user entering into a squat or bent-over position adjacent to an edge of the tire, placing the palms of their hands in an upward facing orientation on a bottom surface of the tire, and then exploding upward to flip the tire onto an opposite side.

While an effective piece of equipment, particularly for developing explosive strength, the exercise tire is not without its drawbacks. Aside from the difficulty of justifying floor space for a large piece of equipment that is typically used for a small number of exercises, the physical structure of the tire is such that its current use can lead to injury. When performing the tire-flip, a user must orient their hands so that their palms face upward against a downward facing surface of the tire. However, this places the user's biceps in a vulnerable condition particularly susceptible to injury, such as muscle strain or tendon damage. Also, there is a tendency for users to round their lower back while in the squat or bent-over position in order to position their hands sufficiently underneath the tire, which may also make injury more likely when performing the explosive movement of a tire-flip.

Therefore, there is a need for a device that increases the versatility of the exercise tire while also making it safer and easier to use.

BRIEF SUMMARY OF THE INVENTION

An exercise device includes a frame having a width and a length and defining a first opening extending in a direction perpendicular to the width and the length. The first opening is sized to retain at least a portion of a weighted object therein such that the width and the length of the frame extends along at least a portion of a width and a length of the weighted object, respectively, and externally thereto when the frame is connected to the weighted object. A handle member is connected to the frame to be gripped by a user.

An exercise device for use with a weighted object includes a frame comprised of a plurality of interconnected members that define first and second openings. The first opening is sized to retain a portion of an weighted object therein such that, when the frame is connected to the weighted object and is retained within the first opening. The second opening aligns with an opening of the weighted object. A first member of the plurality of interconnected members includes a grip segment configured to be gripped by a user and is disposed external to the weighted object and adjacent to a width thereof when the frame is connected to the weighted object.

A device for facilitating physical exercise includes first and second lateral portions each comprised of a plurality of intersecting horizontal and vertical members that form a perimeter of a first passageway sized to at least partially retain a weighted object therein. A plurality of intermediate members extends between and connects the first and second lateral portions. At least one of the intermediate members is configured to be gripped by a hand.

BRIEF DESCRIPTION OF THE DRAWINGS

The features, aspects, and advantages of the present invention will become better understood with regard to the following description, appended claims, and accompanying drawings in which:

DETAILED DESCRIPTION

Figure 1:
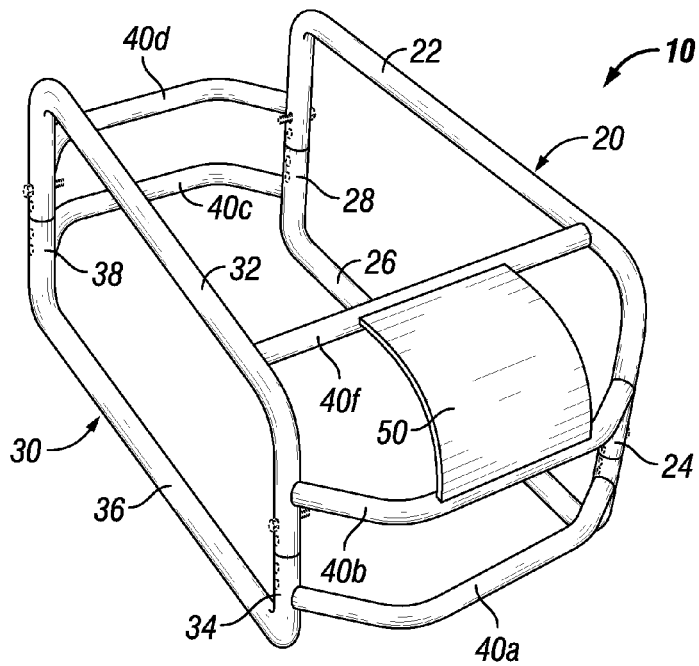
FIG. 1 is a front perspective view of an exercise tire frame according to one embodiment of the present disclosure.

As used herein, the terms "about," "generally," and "substantially" are intended to mean that slight deviations from absolute are included within the scope of the term so modified.

FIGS. 1-5 depict an exercise tire frame 10 according to one embodiment of the present disclosure. Frame 10 generally includes a first lateral portion 20, a second lateral portion 30, intermediate members 40, and a skid plate 50.

Figure 3:
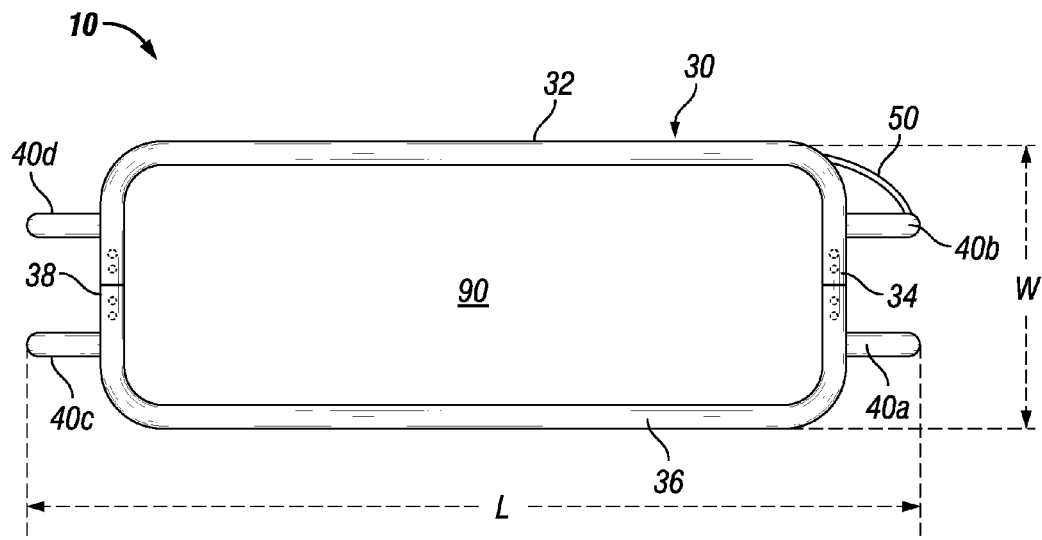
FIG. 3 is a side view of the frame of FIG. 1.

The first lateral portion 20 is comprised of first and second horizontal members 22, 26 and first and second vertical members 24, 28. Vertical members 24, 28 intersect the horizontal members 22, 26 to form a substantially rectangular-shaped loop wherein the corners of such loop are rounded. The second lateral portion 30 is similar to first lateral portion 20. In this regard, the second lateral portion 30 is comprised of first and second horizontal members 32, 36 and first and second vertical members 34, 38 that intersect to form a substantially rectangular-shaped loop. Vertical members 24, 28, 34, and 38 extend along and define a width (W) of frame 10, and horizontal members 22, 26, 32, and 36 extend along and define a length (L) of frame 10, as shown in FIG. 3.

Figure 4:
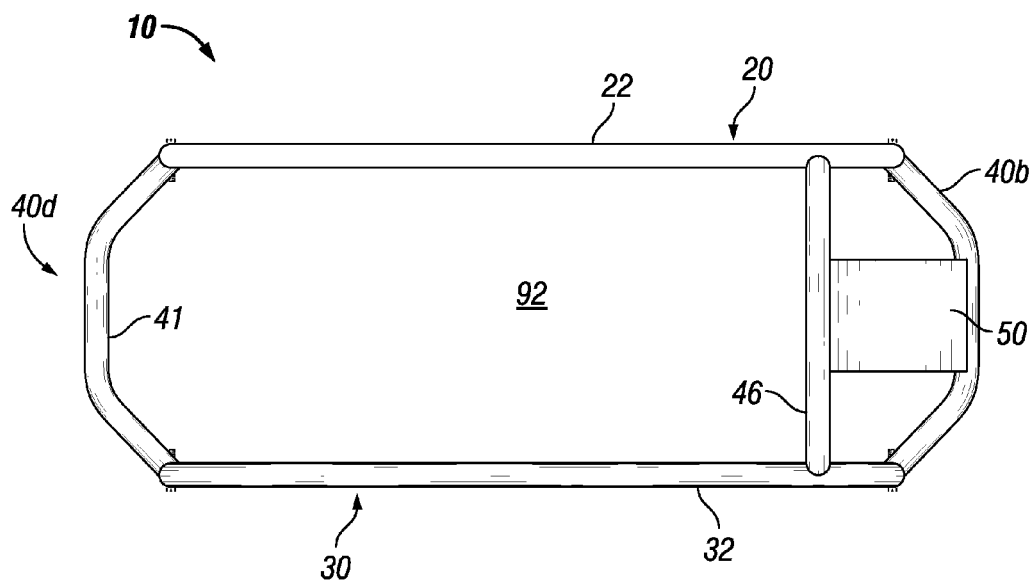
FIG. 4 is a top view of the frame of FIG. 1.
Figure 5:
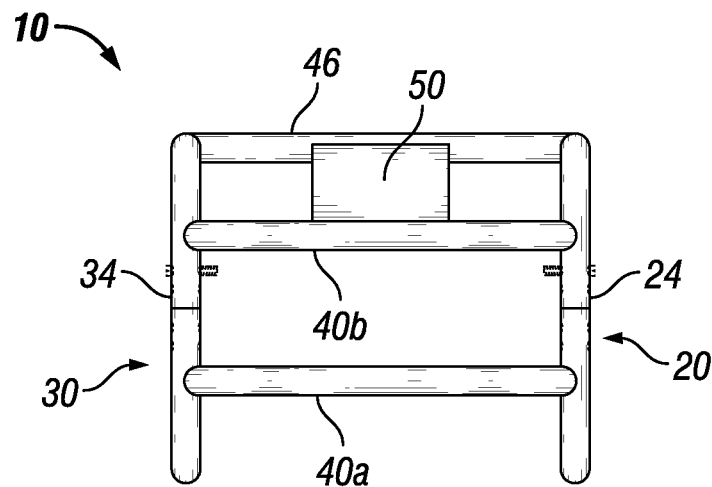
FIG. 5 is a front view of the frame of FIG. 1.

The plurality of intermediate members 40 includes first, second, third, fourth and fifth intermediate members 40a-f. First and second intermediate members 40-a-b connect to and extend between first vertical members 24 and 34 of lateral portions 20 and 30, respectively. Third and fourth intermediate members 40c-d connect to and extend between second vertical members 28 and 38 of lateral portions 20 and 30, respectively. Intermediate members 40-a-d extend in an arcuate path away from and back toward lateral portions 20 and 30 so that a grip segment 41 of intermediate members 40a-d is offset from lateral portions 20 and 30 as is best shown in FIG. 4. Grip segment 41 is generally straight along its length so that a user can grip this segment to perform a tire flip, as is described in more detail below. However, in some embodiments, the entirety of each intermediate portion 40-*a-d* may be curved into an arc rather than bent into a plurality of straight segments, as is shown.

Fifth intermediate member 40*f* connects to first horizontal members 22 and 32 of the lateral portions. Unlike intermediate members 40*a-d*, fifth intermediate member 40*f* is substantially straight along its length. Fifth intermediate member 40*f* provides support for skid plate 50. Skid plate 50 connects to and extends between second and fifth intermediate members 40*b*, 40*f*. Skid plate 50 is curved and allows the weight of frame 10, as well as a tire within the frame 10, to be rested on the skid plate 50 and pushed along the ground, as described in more detail below.

First and second lateral portions 20, 30 are connected by intermediate members 40-*a-f* so that lateral portions 20 and 30 are substantially parallel. However, in some embodiments, lateral portions 20 and 30 may be connected so that they are slightly angled toward each other. In addition, lateral portions 20 and 30 are connected so that their respective members define a laterally extending opening or passageway 90 of frame 10, as shown in FIG. 3. This passageway 90 extends in a direction perpendicular to the length and width of frame 10. Also, horizontal members 22, 26, 32, and 36 and intermediate members 40-*a-f* define a vertically extending opening or passageway 92 (see FIG. 4) that intersects laterally extending passageway 90. Laterally extending passageway 90 is sized to receive and retain a portion of an exercise tire, such as a tractor tire, airplane tire, truck tire, or car tire, for example. In addition, vertically extending passageway 92 is sized to allow a user to stand between horizontal members 22, 26 and 32, 36.

Lateral portions 20 and 30, intermediate members 420*a-f*, and skid plate 50 are generally made from a metallic material, such as steel or aluminum, for example. In addition, intermediate members 40-*a-f* and lateral portions 20 and 30 are preferably tubular structures that have a hollow core which allows frame 10 to be durable yet light in weight. However, in some embodiments, lateral portions 20 and 30 and intermediate members 40-*a-f* may alternatively be cylindrical structures with solid cores. In addition, lateral portions 20 and 30 and intermediate members 40-*a-f* can vary in diameter between each other. For example, lateral portions 20 and 30 may have a larger diameter than intermediate members 40*a-f*. However, the cross-sectional dimensions of each of the lateral portions 20 and 30 and intermediate members 40-*a-f* are such that they can be gripped by various hand sizes. The lateral portions 20 and 30, intermediate members 40*a-f*, and skid plate 50 are preferably welded together. However, in some embodiments they may be connected via fasteners, press-fit, snap-fit, or the like.

Figure 2:
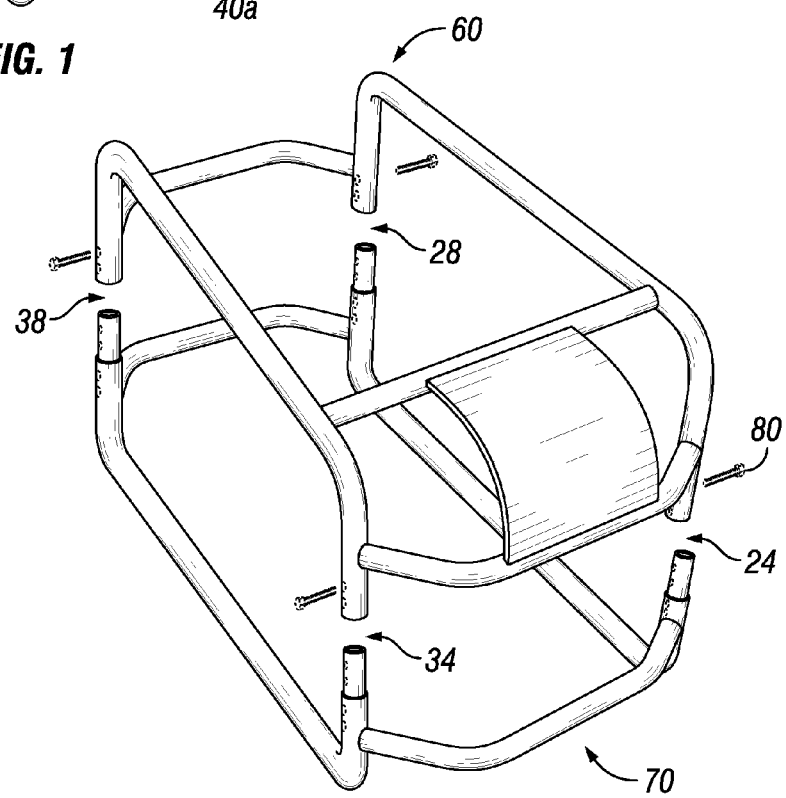
FIG. 2 is an exploded view of the frame of FIG. 1.
Figure 6:
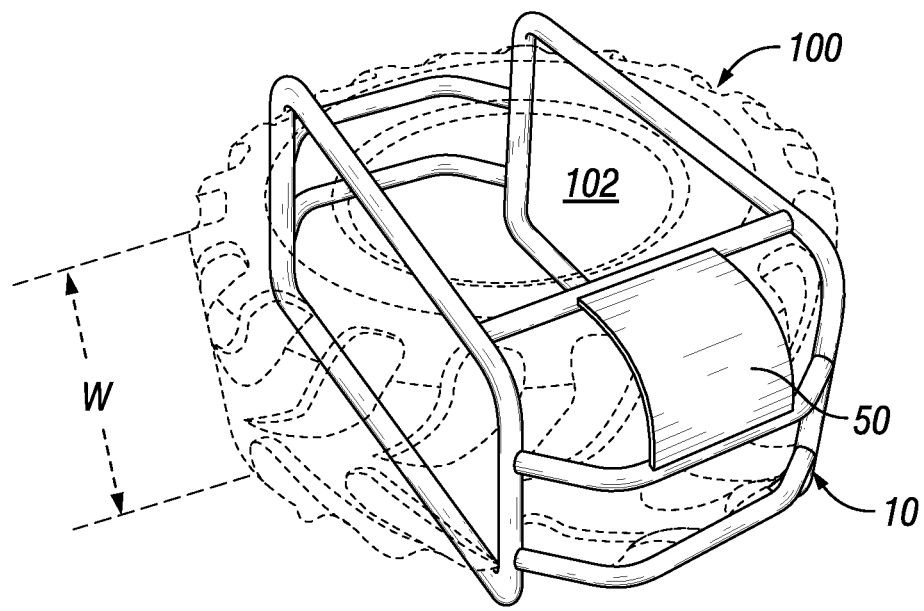
FIG. 6 is a perspective view of the frame of FIG. 1 coupled to an exercise tire.

As depicted in FIG. 6, tire frame 10 connects to an exercise tire 100. To help facilitate this connection, tire frame 10 may be provided disassembled in pieces so that it can be assembled about the exercise tire 100. In this regard, as shown in FIG. 2, tire frame 10 may be broken down into an upper assembly 60 and a lower assembly 70. The upper and lower assemblies 60, 70 are separated along vertical members 24, 28, 34, and 38. In this regard, the vertical members may be segmented so that they can be split along their respective lengths. In addition, as mentioned above, vertical members 24, 28, 34, and 38 may be constructed from tubular structures. The tubular structures that comprise the segmented vertical members may be constructed so that segments of such tubular structures may have a smaller outer diameter than an inner diameter of corresponding segments to allow the upper and lower assemblies 60, 70 to come together and be connected by fasteners 80 (best shown in FIG. 2).

When connected to tire 100, lateral portions 20 and 30 surround tire 100 so that tire 100 extends through laterally extending passageway 90, and vertically extending passageway 92 aligns with an opening 102 of the tire (best shown in FIG. 6). Horizontal members 22, 26, 32, and 36 extend along the length or partial length (e.g., chord length) of the exercise tire, while vertical members 24, 28, 34, and 38 extend along a width of tire 100. Also, intermediate members 40-*a-d* are disposed external to and between a width of tire 100 to facilitate a tire flip and other exercises as described below. In addition, as mentioned above, intermediate members 40-*a-d* extend from lateral portions 20 and 30 in an arcuate path so that grip segments 41 thereof are offset from lateral portions 20 and 30. This configuration provides relief for the curvature of tire 100 and also provides space between each grip segment 41 and tire 100 so that a user can comfortably grip the grip segment 41 without obstruction from tire 100.

Figure 7:
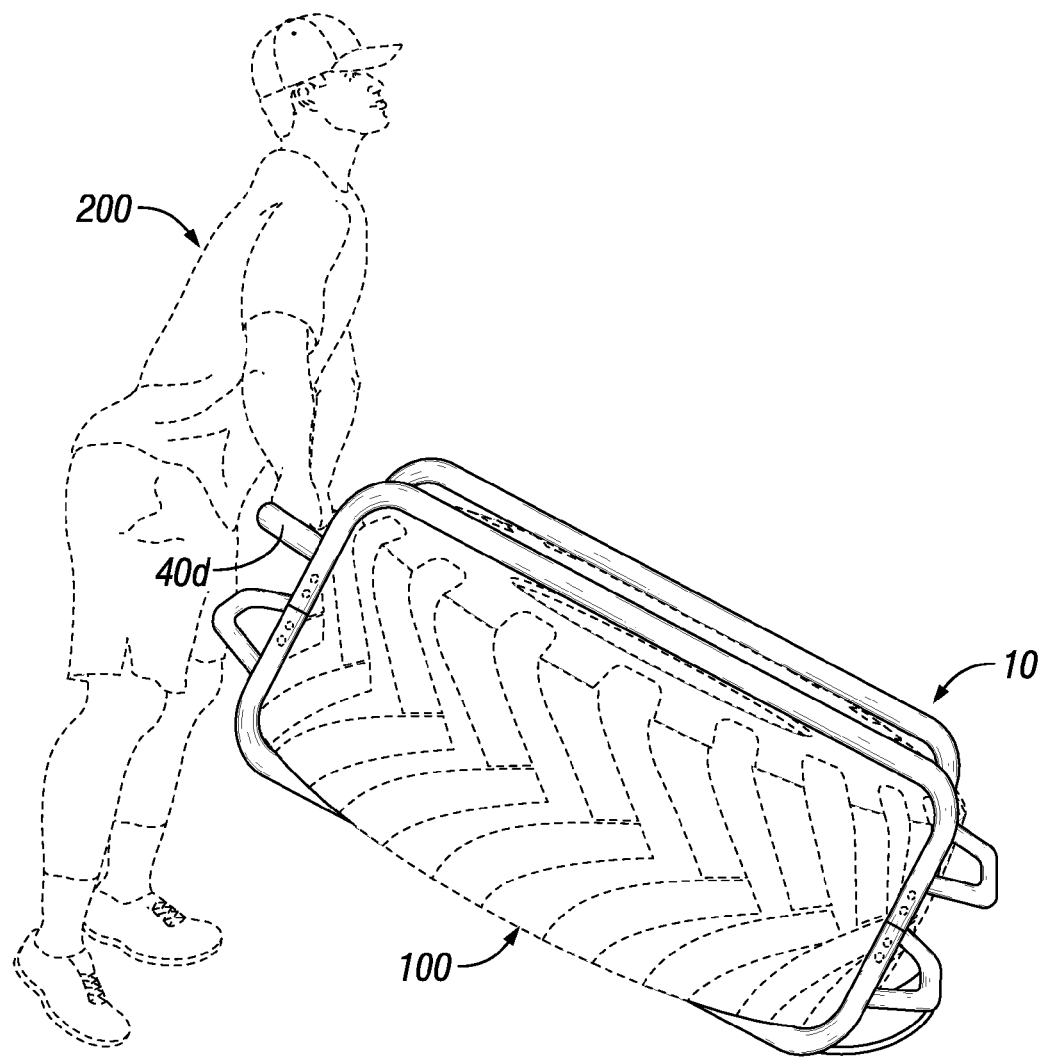
FIG. 7 depicts a method of using the frame of FIG. 1 according to one embodiment of the present disclosure.

FIG. 7 depicts a method of using frame 10 according to one embodiment of the present disclosure. In this method, a user flips tire 100 using frame 10. In this regard, tire frame 10 surrounding tire 100 lay on the ground so that frame 10 rests on horizontal members 22 and 32. The objective is to flip tire 100 to the other side so that frame 10 rests on horizontal members 26 and 36. A user 200 approaches frame 10 and assumes a starting position in which the user grips one of intermediate members, such as member 40*d*, and enters into a squat. As shown, user 200 may grip intermediate member 40*d* with a pronated grip (i.e., palms facing downward). This may help shield the user's biceps from excessive stress during the tire flip, particularly as compared to a supinated grip (i.e., palms facing upward) which is typical of a tire flip without frame 10. In addition, the distance that intermediate member 40*d* is offset from tire 10 helps the user assume a comfortable squat without the need to significantly arch his or her back. After assuming the starting position, user 200 explodes out of the squat, as shown in FIG. 7, and flips tire 100 so that frame 10 and tire 100 land on an opposite side thereof. Thereafter, user 200 can immediately perform another tire flip using another intermediate member without having to walk around tire 10. It is noted that intermediate members 40-*a-d* are located along respective vertical members 24, 28, 34, 38 so as to not interfere with the tire flip as tire 100 and frame 10 are pivoted from one side to another. In addition, skid plate 50 is sufficiently curved so as to not oppose the flip.

Figure 8:
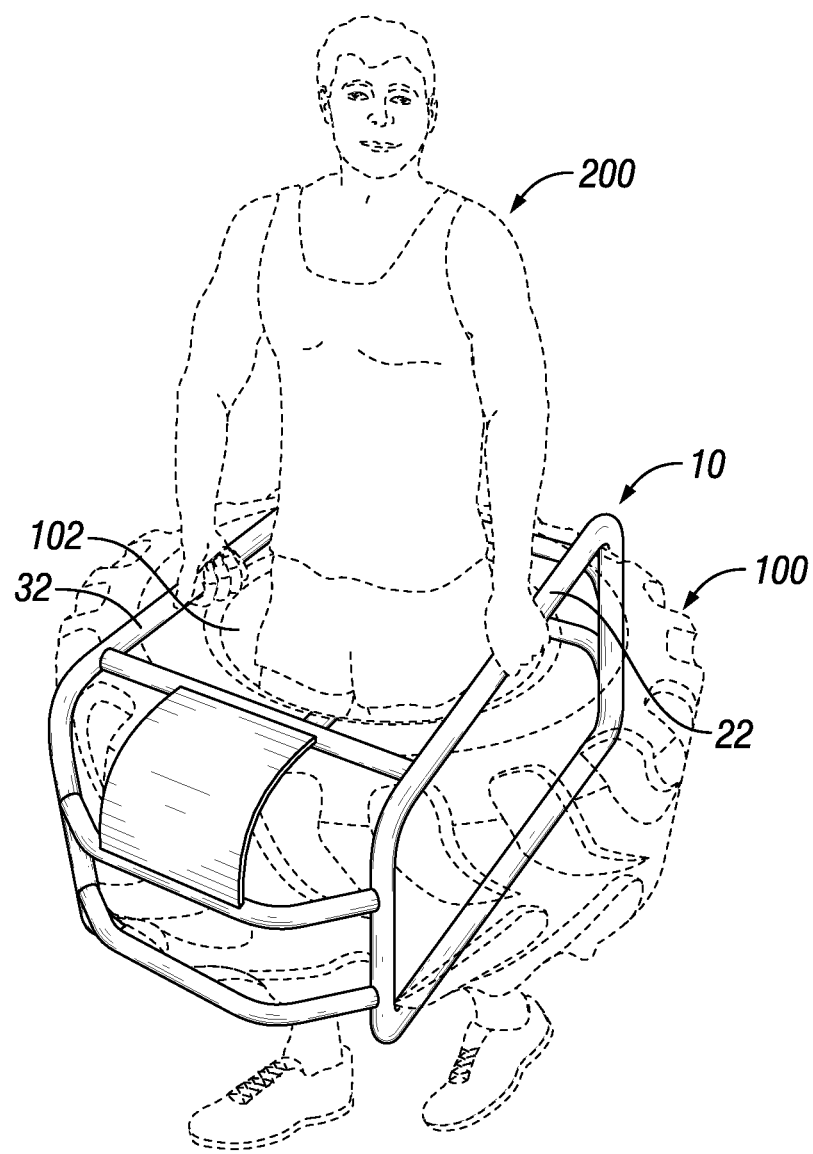
FIG. 8 depicts a method of using the frame of FIG. 1 according to another embodiment of the present disclosure.

FIG. 8 depicts a method of using frame 10 according to another embodiment of the present disclosure. In this method, user 200 carries tire 100 using frame 10, which, without frame 10, would be very difficult if not impossible. In this regard, tire frame 10 surrounding tire 100 lay on the ground so that frame 10 rests on horizontal members 26, 36. User 200 steps into opening 102 in the tire between horizontal members 22, 26 and 32, 36. The user 200 squats and grips horizontal members 22, 32. Horizontal members 22, 32 may partially extend over tire opening 102 so as to provide user 200 with an unobstructed grip. User 200 then stands and walks while carrying tire 100. The positioning of horizontal members 22, 26, 32, and 36 allows the user's hands to assume natural position with his or her palms facing toward their body.

Figure 9:
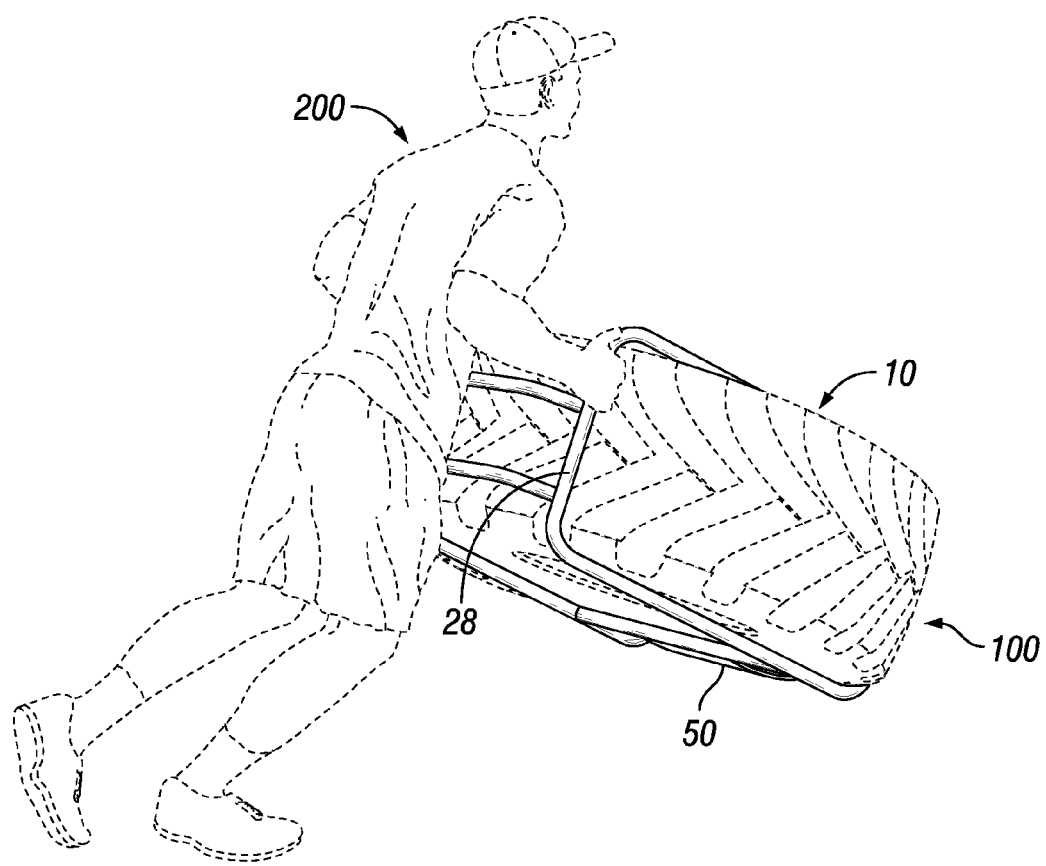
FIG. 9 depicts a method of using the frame of FIG. 1 according to a further embodiment of the present disclosure.

FIG. 9 depicts a method of using frame 10 according to a further embodiment of the present disclosure. In this method, user 200 carries tire 100 using frame 10, which again, without frame 10, would be very difficult if not impossible. In this regard, tire frame 10 surrounding tire 100 lay on the ground so that frame 10 rests on rests on horizontal members 22 and 32 and skid plate 50 faces the ground. User 200 approaches frame 10, assumes a squat position, and grips vertical members 28, 38 with a neutral grip, as shown. User 200 then lifts one end of the frame and tire assembly so as to pivot the assembly onto skid plate 50. User 200 then pushes the tire and frame assembly so that skid plate 50 slides along the ground.

Numerous variations, additions, and combinations of the features discussed above can be implemented without departing from the present invention. For example, in some embodiments more or less intermediate members 40 may interconnect lateral portions 20 and 30. More particularly, one tire frame embodiment, not shown, may not include a skid plate and may only include a first intermediate member connecting first vertical members 24, 34 and a second intermediate member connecting second vertical members 28, 38. In another tire frame embodiment, three or more intermediate members 40 may connect first vertical members 24, 34 and second vertical members 28, 38, respectively.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cage for an exercise tire comprising:
a frame having a width and a length and defining a first opening extending in a direction perpendicular to the width and the length, the first opening being sized to retain at least a portion of an exercise tire therein such that the width and the length of the frame extends along at least a portion of a width and a length of the exercise tire, respectively, and externally thereto when the frame is connected to the exercise tire, the frame having a plurality of interconnected members wherein a first and second member of the interconnected members define a second opening that intersects the first opening and that aligns with an opening of the exercise tire when disposed within the frame, the first and second members being spaced apart so that a user can stand through the second opening and within the opening of the exercise tire while gripping the first and second members; and
a handle extending between the first and second members to be gripped by the user while standing outside of the second opening.

2. The cage of claim 1, further comprising a skid plate connected to adjacent ones of the interconnected members.

3. The cage of claim 2, wherein the skid plate is disposed between the first and second members.

4. The cage of claim 1, wherein the plurality of interconnected members are constructed from elongate metal tubes.

5. The cage of claim 1, wherein the handle is connected to at least two of the interconnected members.

6. The cage of claim 5, wherein the at least two interconnected members are vertical members that respectively extend from the first and second members.

7. The cage of claim 5, wherein the handle extends along an arcuate shaped path between the at least two interconnected members and includes a grip segment that is substantially straight along its length.

8. The cage of claim 1, wherein the frame is comprised of a first assembly and a second assembly, the first and second assemblies being connectable to each other about the weighted object.

9. The cage of claim 8, wherein the first assembly includes the first and second members.

10. An exercise device for use with an exercise tire comprising:
a frame comprised of a plurality of interconnected members that define first and second openings, the first opening being sized to retain a portion of the exercise tire therein such that, when the exercise tire is retained within the first opening, the second opening aligns with an opening of the exercise tire, the second opening being at least partially defined by first and second members positioned at a periphery of the second opening, the first and second members being spaced a distance sufficient to allow a user to stand within the second opening of the frame and within an opening of the exercise tire, and wherein the frame further includes a grip segment connected to at least two interconnected members of the frame and extending in a direction transverse to the first and second members, the grip segment is configured to be gripped by a user and is disposed external to the exercise tire and adjacent to a width thereof when the frame is connected to the exercise tire.

11. The device of claim 10, wherein the interconnected members include horizontal members, vertical members and a plurality of intermediate members, the horizontal members and vertical members form lateral portions of the frame and define the first opening, the intermediate members extend between and connect the lateral portions.

12. The device of claim 11, wherein the horizontal members of the lateral portions include the first and second members, respectively, and wherein the intermediate members include third and fourth members, the third and fourth members partially defining the second opening.

13. The device of claim 11, wherein the third member extends along an arcuate shaped path and the grip segment is substantially straight along its length.

14. The device of claim 11, further comprising a skid plate that is connected to and extends between adjacent ones of the intermediate members.

15. The device of claim 11, wherein the vertical members are segmented so that the frame can be split along the respective lengths of the vertical members into an upper assembly and lower assembly.

16. An exercise tire cage for facilitating physical exercise, comprising:
first and second lateral portions each comprised of a plurality of horizontal and vertical members that form a perimeter of a first passageway sized to at least partially retain an exercise tire therein, the plurality of horizontal and vertical members of each of the lateral portions intersecting so as to form a plurality of rounded corners at first and second ends and at top and bottom ends of the exercise tire cage, and
first and second intermediate members extending between and connecting the first and second lateral portions, the first intermediate member being disposed at a first end of the exercise tire cage, the second intermediate member being disposed at a second end of the exercise tire cage, and the first and second intermediate members being positioned between the top and bottom ends and being configured to be gripped by a hand such that the first and second members can be used to flip the exercise tire frame from the top end to the bottom end and vice versa.

17. The exercise tire cage of claim 16, wherein the horizontal members and intermediate members define a second passageway that intersects the first passageway.

18. The exercise tire cage of claim 17, wherein the first lateral portion and second lateral portion each include two horizontal members and two vertical members that intersect to form a rectangular shaped loop.

19. The exercise tire cage of claim 18, wherein a first intermediate member of the intermediate members connects to a first pair of the vertical members of the first and second lateral portions, and a second intermediate member connects to a second pair of the vertical members of the first and second lateral portions.

20. The exercise tire cage of claim 19, further comprising a plurality of intermediate members and a skid plate, the plurality of intermediate members includes the first and second intermediate members, and the skid plate is connected to two adjacent intermediate members at one of the first and second ends of the exercise tire cage.

* * * * *